(12) United States Patent
Glaser

(10) Patent No.: US 10,082,793 B1
(45) Date of Patent: Sep. 25, 2018

(54) MULTI-MODE TRANSPORTATION PLANNING AND SCHEDULING

(71) Applicant: GM GLOBAL TECHNOLOGY OPERATIONS LLC, Detroit, MI (US)

(72) Inventor: Stuart Glaser, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/464,779

(22) Filed: Mar. 21, 2017

(51) Int. Cl.
*G05D 1/02* (2006.01)
*G01C 21/34* (2006.01)
*G06Q 50/30* (2012.01)
*G06Q 10/06* (2012.01)
*G06Q 10/10* (2012.01)
*G08G 1/00* (2006.01)
*G06F 17/30* (2006.01)

(52) U.S. Cl.
CPC ......... *G05D 1/0212* (2013.01); *G01C 21/343* (2013.01); *G05D 1/0276* (2013.01); *G05D 1/0297* (2013.01); *G06Q 10/06314* (2013.01); *G06Q 10/109* (2013.01); *G06Q 50/30* (2013.01); *G08G 1/202* (2013.01); *G06F 17/3087* (2013.01)

(58) Field of Classification Search
CPC .. G05D 1/0212; G05D 1/0276; G05D 1/0297; G01C 21/343; G01C 21/3423; G06Q 50/30; G06Q 10/109; G06F 17/3087
See application file for complete search history.

(56) References Cited

U.S. PATENT DOCUMENTS

| | | | | |
|---|---|---|---|---|
| 6,411,897 B1 * | 6/2002 | Gaspard, II | .......... | G01C 21/343 340/991 |
| 8,725,612 B2 * | 5/2014 | Mundinger | .......... | G06Q 10/047 705/35 |
| 2015/0339928 A1 * | 11/2015 | Ramanujam | ........... | G08G 1/202 701/23 |
| 2016/0298977 A1 * | 10/2016 | Newlin | ............... | G01C 21/3423 |
| 2017/0282821 A1 * | 10/2017 | Zych | ..................... | B60R 16/037 |

* cited by examiner

*Primary Examiner* — Michael J Zanelli
(74) *Attorney, Agent, or Firm* — Lorenz & Kopf, LLP

(57) ABSTRACT

A multi-mode transportation system and method are provided in which a scheduler service (SS) generates an initial transportation schedule (TS) including a list of transport legs where transport over one or more transport legs is via an autonomous vehicle (AV) from an initial scheduled pick-up location (ISPUL) at an initial scheduled pick-up time (ISPUT). The SS monitors for any changes to the initial TS, and if any are detected, updates the initial TS based on the changes to generate a current TS that includes a currently scheduled pick-up time (CSPUT) and a currently scheduled pick-up location (CSPUL) for the transport leg. The CSPUT/CSPUL can be the same as or different than the ISPUT/ISPUL depending on whether or not there were changes to the ISPUT/ISPUL. An AV can be selected from the fleet of AVs and automatically controlled to arrive at the CSPUL to pick-up the passenger by the CSPUT.

20 Claims, 7 Drawing Sheets

MULTI-MODE TRANSPORTATION PLANNING AND SCHEDULING

TECHNICAL FIELD

Embodiments of the subject matter described herein relate generally to transportation systems. More particularly, embodiments of the subject matter relate to automated dispatching of autonomous vehicles in a multi-mode transportation system that schedules different modes of transportation for a passenger between a starting location and a destination location.

INTRODUCTION

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

It would be desirable to provide a system that can coordinate scheduling of different modes of transportation to transport of a passenger between a starting location and a destination location. For example, a system that can coordinate travel over a route using automobiles, buses, subways, trains, boats, ferries, aircraft, etc. would be highly desirable. Using autonomous vehicles to transport passengers as part of such a system would be ideal since they could be used to transport passengers over certain legs of a route between other modes of transport. For example, a passenger might want to travel via a subway and ferry to their ultimate destination. Using autonomous vehicles to transport the passenger from a starting location to the subway, and then from the subway to the ferry port would simplify travel, and it would be desirable if a system existed to coordinate dispatch of the autonomous vehicles at various pick-up locations along the route.

Accordingly, it is desirable to provide systems and methods that can schedule dispatch of autonomous vehicles as part of travel plan so that the autonomous vehicles are present when the passenger arrives at particular locations along a route so that the passenger does not have to wait. At the same time, it would be desirable if such systems and methods could automatically adjust dispatch scheduling when the passenger's travel plan changes during travel. Furthermore, other desirable features and characteristics of the present invention will become apparent from the subsequent detailed description and the appended claims, taken in conjunction with the accompanying drawings and the foregoing technical field and background.

SUMMARY

A multi-mode transportation system and method are provided for controlling dispatch of an autonomous vehicle so that the autonomous vehicle arrives a scheduled pick-up location. A scheduler service generates an initial transportation schedule for a passenger based on a selected route option. The initial transportation schedule comprises a list of transport legs along a selected route between a starting location and a destination location. The passenger is initially scheduled to be transported over at least one transport leg via an autonomous vehicle from an initial scheduled pick-up location at an initial scheduled pick-up time.

The scheduler service communicates the initial transportation schedule to a user device of the passenger and to a dispatch controller, and monitors for any changes to the initial transportation schedule. When changes to the initial transportation schedule are detected, the scheduler service updates the initial transportation schedule based on the changes to generate a current transportation schedule. The current transportation schedule includes a currently scheduled pick-up time and a currently scheduled pick-up location for the at least one transport leg that utilizes an autonomous vehicle to transport the passenger.

A dispatch controller can select a first autonomous vehicle from the fleet of autonomous vehicles that has been determined to be within range to transport the passenger over the transport leg. The dispatch controller generates and send dispatch instructions to the first autonomous vehicle. The dispatch instructions can include the currently scheduled pick-up location and the currently scheduled pick-up time that the first autonomous vehicle has to be at the currently scheduled pick-up location for the at least one transport leg. The currently scheduled pick-up time can be the same as an initial scheduled pick-up time when there are no changes to the initial scheduled pick-up time, or different than the initial scheduled pick-up time when there are changes to the initial scheduled pick-up time. Similarly, the currently scheduled pick-up location can be the same as the initial scheduled pick-up location when there are no changes to the initial scheduled pick-up location, or different than the initial scheduled pick-up location when there are changes to the initial scheduled pick-up location.

The first autonomous vehicle can then be automatically controlled, based on the dispatch instructions, to arrive at the currently scheduled pick-up location to pick-up the passenger for transport along the at least one transport leg.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
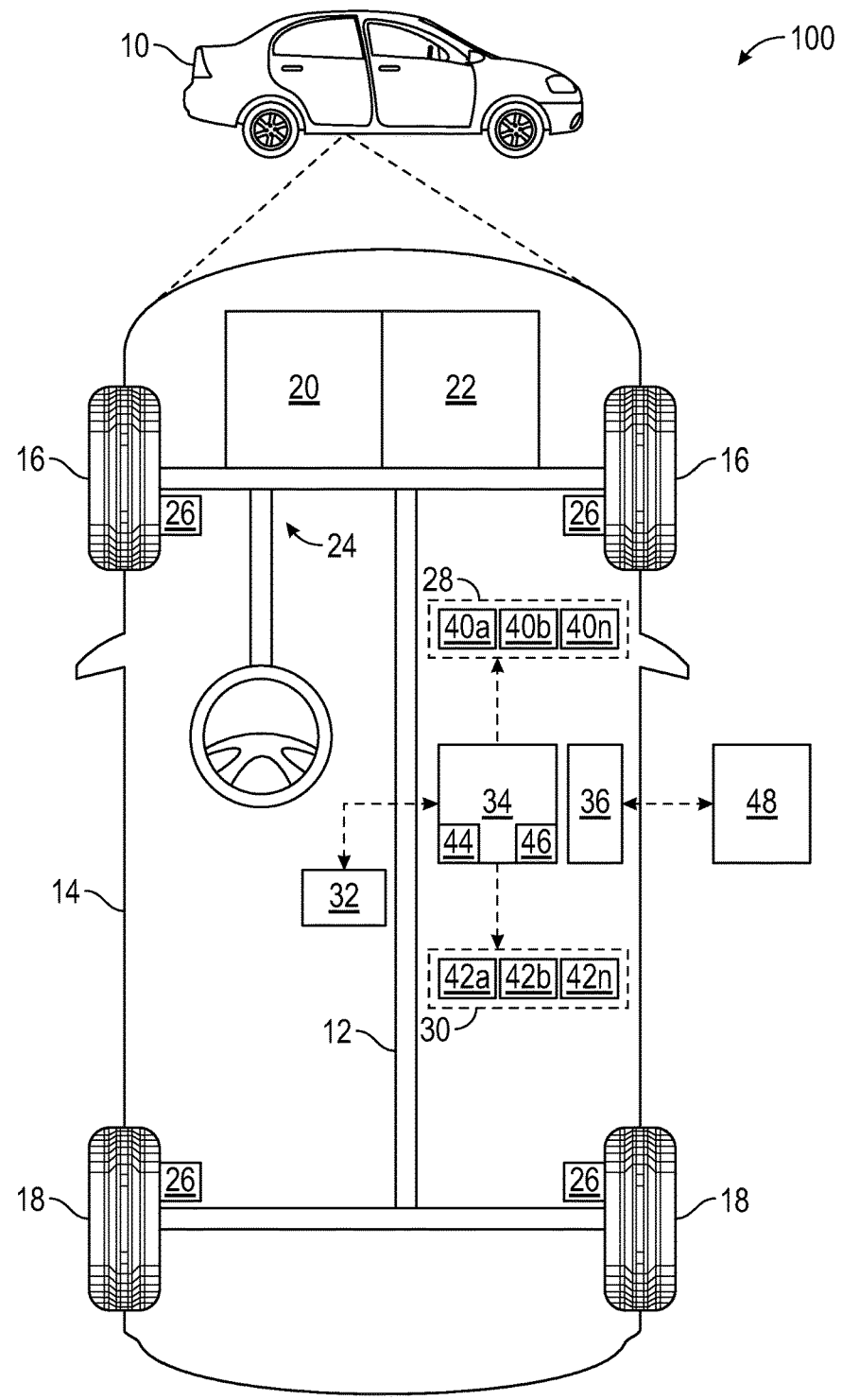
FIG. 1 is a functional block diagram illustrating an autonomous vehicle configured in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The disclosed embodiments relate to systems and methods for dynamically scheduling dispatch of autonomous vehicles. In one embodiment, dispatch of autonomous vehicles can be scheduled as part of a multi-mode transportation system that includes different transport options along a route between the pick-up location and the destination location. The disclosed embodiments can provide a passenger with an optimized travel experience by coordinating a travel plan for the passenger using autonomous vehicles in conjunction with other modes of transportation when the passenger travels between a start and a destination location. The system that takes into account user preferences to automatically schedule a transportation plan in real time. The system can also automatically adjust to changes in passenger's schedule.

In one embodiment, a passenger identifies the start and destination locations, and possibly the desired modes of transportation (e.g., autonomous vehicle, bus, subway, train, boats, ferry, aircraft, etc.).

The system schedules the autonomous vehicles as needed so that autonomous vehicles are available to match up with the schedules of existing transportation infrastructure. The system controls dispatch of autonomous vehicles so that a passenger will be picked up at one or more locations along the route (e.g., an autonomous vehicle will be scheduled so that it arrives concurrently with at a train station to pick up a passenger when the train arrives). For example, a first autonomous vehicle takes the passenger from home to train station, the passenger takes the train to a station, and a second autonomous vehicle takes the passenger from the train station to the ultimate destination.

In some embodiments, the transportation schedule for a passenger can be adjusted to account for changes in schedule (e.g., if a train is late, the autonomous vehicle coming to pick the passenger up could be dispatched to another passenger, and a new autonomous vehicle can be dispatched later to the pick-up the passenger). Dispatching of autonomous vehicles can be dynamically adjusted to changes in the passenger's travel schedule so that an autonomous vehicle is at a particular location when the passenger arrives even when the passenger's schedule changes. As such, autonomous vehicles do not waste time waiting for a passenger to arrive when his/her schedule changes while traveling along the route. If the change in arrival time is significant, a new autonomous vehicle can be dispatched so that the originally scheduled autonomous vehicle can be dispatched to another passenger.

With reference to FIG. 1, a control system shown generally at 100 is associated with a vehicle 10 in accordance with various embodiments. In general, the control system 100 is suitably configured to operate the vehicle 10 in an autonomous manner as needed.

FIG. 1 is a functional block diagram illustrating an autonomous vehicle 10 configured in accordance with various embodiments. As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16, 18 are each rotationally coupled to the chassis 12 near a respective corner of the body 14.

In various embodiments, the vehicle 10 is an autonomous vehicle and the control system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16, 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16, 18. The brake system 26 may, in various embodiments, include friction brakes, brake by wire, a regenerative braking system such as an electric machine, and/or other appropriate braking systems. The steering system 24 influences a position of the of the vehicle wheels 16, 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
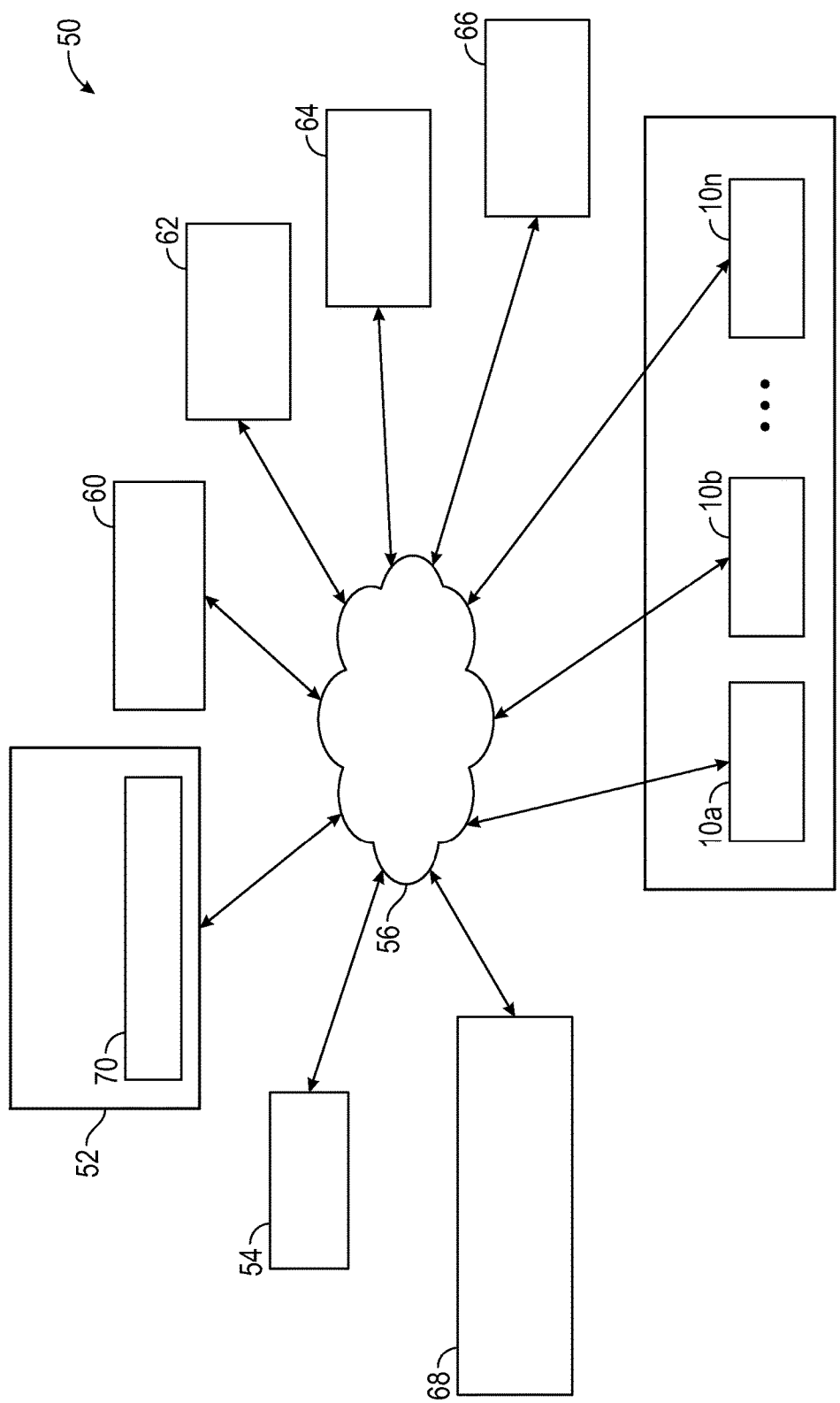
FIG. 2 is a functional block diagram illustrating a transportation system that includes at least one autonomous vehicle of FIG. 1 in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system. In certain embodiments, the data storage device 32 stores and updates additional information, which may be described in more detail below.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, the autonomous vehicle 10 described with regard to FIG. 1 may be suitable for use in the context of a transportation system in a certain geographical area (e.g., a city, a county, a school or business campus, a shopping complex, or the like) or may simply be managed by a remote system. For example, the autonomous vehicle 10 may be utilized as part of a multi-mode transportation system.

FIG. 2 is a functional block diagram illustrating a multi-mode transportation system 50 that includes one or more autonomous vehicles 10a . . . 10n like those of FIG. 1 in accordance with various embodiments. The multi-mode transportation system 50 includes an autonomous vehicle transportation system 52 that includes or is otherwise associated with one or more autonomous vehicles (AVs) 10a . . . 10n, as described above with reference to FIG. 1, that are part of a fleet. The multi-mode transportation system 50 also includes one or more other transportation systems that provide different modes of transportation as will be explained below. The multi-mode transportation system 50 further includes one or more user devices 54 that communicate with the autonomous vehicles 10 and/or the automated vehicle transportation system 52 via a communication network 56. The multi-mode transportation system 50 also includes a wireless carrier system 60, a land communication system 62, a satellite communication system 64, and route navigation systems 66 that are utilized by the automated vehicle transportation system 52, the user device(s) 54, the autonomous vehicles 10 and the other transportation systems 68 to perform various functions described herein. The multi-mode transportation system 50 monitors location of the passenger's user device 54, the autonomous vehicles 10, and other modes of transportation by the other transportation systems 68 using location determination techniques or methodologies such as GPS systems so that the respective locations of the passenger and the autonomous vehicles can be determined at any given time.

The multi-mode transportation system 50 can include any number of autonomous vehicles 10. The autonomous vehicle transportation system 52 manages the dispatching, routing, and operation of the autonomous vehicles 10 as part of a transportation schedule for a passenger that includes one or more other modes of transportation (e.g., bus, train, subway, ferry, trains, aircraft, or the like). For instance, the autonomous vehicle transportation system 52 controls the dispatch of the autonomous vehicles based on the arrival/departure schedules and operating status of the other transportation systems. The autonomous vehicles 10 can be automatically controlled to carry passengers from one location to another.

The communication network 56 supports communication as needed between devices, systems, and components supported by the system 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system 62. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the vehicle transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the autonomous vehicle transportation system 52 need not be connected via the land communication system 62, but can include wireless telephony equipment so that it can communicate directly with a wireless network, such as the wireless carrier system 60.

Although only one user device 54 is shown in FIG. 2, embodiments of the transportation system 50 can support any number of user devices 54, including multiple user devices 54 owned, operated, or otherwise used by one person. Each user device 54 supported by the system 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the system 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The autonomous vehicle transportation system 52 includes one or more backend server systems, which may be cloud-based, network-based, or resident at the particular campus or geographical location serviced by the autonomous vehicle transportation system 52. The autonomous vehicle transportation system 52 can be manned by at least one live advisor, at least one automated advisor, or a combination of both. The autonomous vehicle transportation system 52 can communicate with the user devices 54 and the autonomous vehicles 10a . . . 10n to schedule rides, dispatch autonomous vehicles 10a . . . 10n, provide transportation status notifications, provide travel instructions, and the like. In various embodiments, the autonomous vehicle transportation system 52 stores account information such as subscriber authentication information, vehicle identifiers, profile records, behavioral patterns, and other pertinent subscriber information.

In accordance with a typical use case workflow, a registered user of the autonomous vehicle transportation system 52 can create a ride request via the user device 54. The ride request will typically indicate the passenger's desired starting location (e.g., based on their current GPS location), their final destination location, and a departure time. The autonomous vehicle transportation system 52 receives the ride request, processes the request, and dispatches a selected one of the autonomous vehicles 10a-10n (when and if one is available) to pick up the passenger at the designated pickup location and at the appropriate time. The autonomous vehicle transportation system 52 can also generate and send a suitably configured confirmation message or notification to the user device 54, to let the passenger know that a vehicle is on the way.

In accordance with the disclosed embodiments, this regular use case is modified to provide the multi-mode transportation system 50. To explain further, in addition to the autonomous vehicle transportation system 52, the multi-mode transportation system 50 also includes a plurality of other transportation systems that are illustrated collectively by block 68 of FIG. 2. The other transportation systems 68 provide different modes of transportation, and can include any type of transportation system that can be used to transport a passenger along a route in conjunction with one or more autonomous vehicles 10. Without limitation examples of other transportation systems can include transportation systems such as bus systems, train systems, subway systems, air-based transportation systems (e.g., commercial planes or helicopters), water-based transportation systems (e.g., ferries, water taxis, cruise ships, etc.). Any combination of these different transportation systems can be used to transport passengers in accordance with the disclosed embodiments as part of a multi-mode transportation system.

Each of the transportation systems 68 can be controlled and managed by different entities, and will generally set their own transportation schedules or control scheduling of rides for passengers. Among other things many transportation systems will publish schedules that include information about when its vehicles are scheduled to travel over certain routes. This information will include arrival times at certain locations, departure times from certain locations, etc. In addition, many transportation systems provide services that publish this information in real-time on-line. The advantage of this approach is that the transportation system can provide real-time updates on scheduling information such as the location of a particular vehicle or its status including, for example whether the particular vehicle is on-time, delayed, ahead of schedule, cancelled, etc. This information can be accessed in real-time by the scheduling server 70 via application programming interfaces (APIs), and used to schedule multi-mode transportation for passengers.

The autonomous vehicle transportation system 52 includes a scheduling server (SS) 70 that schedules transportation for passengers and controls dispatch of autonomous vehicles in accordance with transportation schedules for those passengers. As will be explained in greater detail below with reference to FIG. 3, the scheduling server 70 can use the information (described above) provided by a passenger to schedule a multi-leg transportation over a route between a starting location and a destination, where transport of that passenger over at least one leg is via autonomous vehicle. The scheduling server 70 can schedule different modes of transportation over various legs of the route, and schedule the dispatch of autonomous vehicles to transport the passenger over certain legs as needed. The autonomous vehicle transportation system 52 and the scheduling server (SS) 70 can be implemented via any computer-based or processor-based hardware system, platform or device that can be configured and programmed in accordance with the various functions, tasks, and steps performed autonomous vehicle transportation system 52 and the scheduling server 70. Such computer-based or processor-based hardware systems, platforms or devices can include one or more processors, memory comprised of computer/processor readable media, data storage, and other hardware, software, firmware that can be used to implement modules and other functionality described herein.

The route navigation systems 66 can be implemented using one or more backend server systems, which may be cloud-based, network-based, or resident at the particular geographical location serviced by the vehicle transportation system 52. The route navigation systems 66 can employ node mapping, pathfinding, and graph traversal techniques, methodologies, and algorithms to determine the route options. Some non-limiting examples can include A* algorithm or the branch-and-bound algorithm. For instance, all of the possible route options can be integrated into a single graph, and an algorithm can be applied to the graph to return different route options for transporting the passenger from a starting location to a final destination. The route navigation systems 66 can include mapping applications that determine different routes between two points. Some non-limiting examples of such mapping applications can include Maps, Google Maps, GPS-based navigation systems, etc. The scheduling server 70 can utilize the route navigation systems 66 to determine different routes between a starting point and a final destination. For each route the scheduling server 70 can then determine all possible transportation options via the other transportation systems 68 that available over that route between the starting point and the final destination. The scheduling server 70 can propose transportation via autonomous vehicles 10 over any legs along the route.

The scheduling server 70 can optimize the transportation schedule based on passenger's preferences such as overall transit time, overall cost, or vehicle/transport preferences. For example, in some cases, travel by mass transit systems, such as subways or busses are preferred because they will be faster, less costly, or both. In those situations, if the passenger indicates a preference for cost optimization, certain modes of transportation, or transit time optimization, the scheduling server 70 can propose transportation using modes of transportation that will be the most cost effective, time efficient and/or that meet constraints regarding travel by specific modes of transportation. For any route that includes transportation gaps between two other transportation systems 68, the scheduling server 70 can propose transportation via autonomous vehicles 10 over those legs to bridge the gaps where travel is not possible or inconvenient via the other transportation systems 68.

Figure 3:
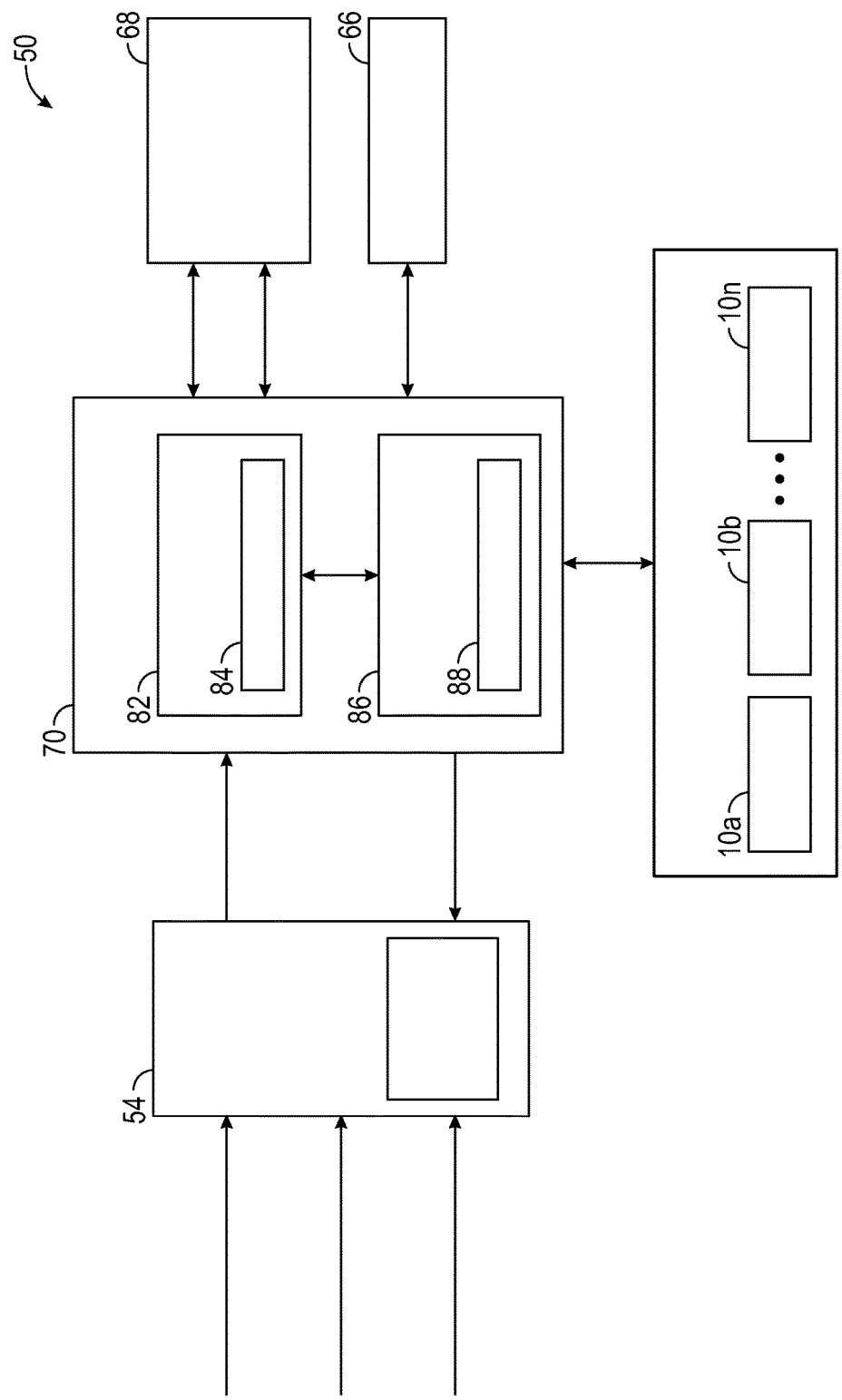
FIG. 3 is a functional block diagram illustrating an exemplary embodiment of a transportation system for scheduling transport of a passenger over a route between a starting location and a destination location in accordance with various embodiments.

FIG. 3 is a functional block diagram illustrating an exemplary embodiment of a transportation system 50 for scheduling transport of a passenger over a route between a starting location and a destination location in accordance with various embodiments. The transportation system 50 includes a fleet of autonomous vehicles 10a-10n, a user device 54 of a passenger, route navigation systems 66, transportation systems 68 including databases for each transportation system, and a scheduling server 70. FIG. 3 will be described with reference to FIGS. 1-2.

The scheduling server 70 includes a scheduler service 82 that includes a transportation optimization module 84, and an AV fleet management system 86 that includes a dispatch controller 88.

The scheduler service 82 receives a transport request from a user device 54. The transport request can include various passenger inputs associated with request for transportation between a starting location and a final destination location. Some non-limiting examples of passenger inputs can include the starting location, the final destination location, a departure time for transportation to begin, and a final arrival time at the final destination location. In addition, other parameters can be included such the passenger's preferred or excluded modes of transportation, an indication that overall travel cost is to be optimized within other constraints (e.g., provide the cheapest route possible given the departure time and final arrival time constraints), an indication that overall travel cost is to be optimized regardless of other constraints (e.g., provide the cheapest route possible regardless of other constraints), an indication that overall travel time is to be optimized within other constraints (e.g., provide the fastest route possible that is within the bounds of the departure time and final arrival time constraints regardless of other constraints like cost), an indication that overall travel time is to be optimized regardless of other constraints (e.g., provide the fastest route possible regardless of other constraints).

The scheduler service 82 processes the transport request and queries the databases for different transportation systems to obtain schedule information for the different transportation systems. As described above, the different transportation systems provide different modes of transportation, and can include transportation systems such as bus systems, subway systems, train systems, ferries, airlines or other aircraft systems, etc. In some embodiments, the scheduler service 82 can query the databases for different transportation systems to obtain schedule information beforehand. In other embodiments, the scheduler service 82 can query the databases for different transportation systems in real-time throughout the method 300 to obtain and update the schedule information including real-time updates for specific routes of each of the other transportation systems 68.

The scheduler service 82 interfaces with the route navigation systems 66 to determine different routes between the starting location and the final destination location, and then processes the schedule information for the different transportation systems to determine which ones offer transportation options that traverse over part of one or more of the routes while satisfying parameters of the transport request (e.g., transport passengers over part of a route between the starting location and the final destination location during times between the departure time and the final arrival time). The scheduler service 82 processes all of these potential transport options that would satisfy parameters of the transport request and constructs or determines different route options for transporting the passenger from the starting location to the final destination location. The different route options can be based on different combinations of the potential transport options, where each potential transport option travels over a particular leg of a given route. In other words, each route option can be split into several segments or transport legs, and each potential transport option travels over one of those segments or transport legs of that route option. Each route option uses at least one autonomous vehicle to transport a passenger over a particular leg, and uses one or more of the other different transportation systems 68 to transport the passenger over one or more other transport legs of that route. The use of one or more AVs in conjunction with the other different transport systems 68 to transport a passenger between a starting location and a final destination location is what make the system 50 a multi-mode transportation system 50.

In one embodiment, once the list of different route options is complete, the scheduler service 82 selects one of the route options. In one embodiment, this selection by the scheduler service 82 is automated via use the optimizer module 84 that selects a particular route option that is optimized according to travel time, cost, passenger preferences regarding mode of transport, or any combination thereof.

In another embodiment, the scheduler service 82 selects one of the route options based on input received from the passenger such as selection of that particular route option by the passenger. In this For example, the scheduler service 82 can send the user device 54 all of the different route options and the passenger can utilize an application on their user device 54 to select a particular route option and send that selection to the scheduler service 82. In some embodiments, the passenger can be presented with multiple options for different pick-up and drop-off points along each route option so that travel time or cost can be optimized for that passenger. In one implementation, the route options presented to the passenger will have been narrowed down to a subset of all possible route options by the optimizer module 84 so that only certain route options are presented to the passenger that meet cost constraints, total travel time constraints, or preferred transportation modes.

Based on the selected route option, the scheduler service 82 generates an initial transportation schedule for the passenger. The initial transportation schedule comprises a list of transport legs along the selected route between the starting location and the destination location. wherein the passenger is initially scheduled to be transported over at least one transport leg via an autonomous vehicle 10 from an initial scheduled pick-up location at an initial scheduled pick-up time. The scheduler service 82 communicates the initial transportation schedule to the user device 54 of the passenger and to the dispatch controller 88.

At any point after generating the initial transportation schedule, the scheduler service 82 can start monitoring for impending arrival of the passenger at a transport leg that requires transport by an AV so that an AV can be dispatched ahead of the passenger's arrival at the pick-up location. In addition, at any point after generating the initial transportation schedule, the scheduler service 82 can also start monitoring for any events that indicate changes to the initial transportation schedule so that it can be updated if there are any changes. The scheduler service 82 executes these monitoring functions continuously to determine whether the currently scheduled pick-up time is within a dispatch threshold and whether any events have occurred to impact the transportation schedule The scheduler service 82 can determine whether the currently scheduled pick-up time (e.g., the initial scheduled pick-up time or a different scheduled pick-up time when the initial scheduled pick-up time has changed) is within a dispatch threshold. In other words, the scheduler service 82 can determine whether the most current "scheduled pick-up time," which depends on whether there have been any changes to the initial transportation schedule that resulted in a change of the initial scheduled pick-up time to a different scheduled pick-up time, are within the dispatch threshold. In one embodiment, the dispatch threshold can be set as a fixed amount of time needed to reasonably ensure that at least one autonomous vehicle from the fleet can arrive at the current scheduled pick-up location by the time the passenger is scheduled to arrive. In other embodiments, the dispatch threshold can be determined and set dynamically by scheduling algorithms that take into account the current locations of each autonomous vehicle and their respective distances from the currently scheduled pick-up location, along with other parameters like current traffic conditions between the current location of each autonomous vehicle and the currently scheduled pick-up location, etc. This way the anticipated time-of-arrival for each autonomous vehicle to the currently scheduled pick-up location can be estimated and used to set the dispatch threshold that reasonably ensures that at least one autonomous vehicle in the fleet can arrive at the currently scheduled pick-up location prior to (or simultaneously with) the currently scheduled pick-up time.

Whenever the scheduler service 82 determines that the currently scheduled pick-up time is within the dispatch threshold, the scheduler service 82 can indicate so to the dispatch controller 88, and the dispatch controller 88 will begin processing to dispatch an AV as will be described below.

When the scheduler service 82 determines that the currently scheduled pick-up time is outside the dispatch threshold, the scheduler service 82 continuously monitors for any changes to the current transportation schedule. For example, the scheduler service 82 can determine whether an event has occurred that requires a change to the initial transportation schedule (or whether an event has occurred that requires a change to the current transportation schedule in the event the initial transportation schedule has undergone changes). When any event occurs that requires a change to the initial transportation schedule, the scheduler service 82 can generate an updated transportation schedule and send it to the dispatch controller 88. Some of the events that can trigger a change to the initial transportation schedule will be described below.

When changes to the initial transportation schedule are determined or detected, the scheduler service 82 can update the initial transportation schedule (or a previously updated version of the transportation schedule) based on the changes to generate a current transportation schedule (i.e., most recently updated version of the transportation schedule), and then sends the current transportation schedule to dispatch controller 88. The current transportation schedule can include a currently scheduled pick-up time and a currently scheduled pick-up location for the transport leg that utilizes the autonomous vehicle 10 to transport the passenger. For example, when changes to the initial transportation schedule are detected, the scheduler service 82 updates the initial transportation schedule based on those changes to generate a current transportation schedule.

In some cases, even though the initial transportation schedule changes, this will not impact the initial scheduled pick-up time or the initial scheduled pick-up location for this transport leg; they will remain the same. In other cases, one or both parameters can change, in which case it becomes necessary for the dispatch controller 88 to change, update or adjust the initial scheduled pick-up time and/or the initial scheduled pick-up location to a new or "currently" scheduled pick-up time and/or a new or "currently" scheduled pick-up location for this transport leg (that is using an autonomous vehicle 10 to transport the passenger).

When the currently scheduled pick-up time is within the dispatch threshold, the dispatch controller 88 can begin the process of dispatching one of the autonomous vehicle that is part of the fleet. To do so, the dispatch controller 88 can determine which autonomous vehicles from fleet are within "pick-up" range given the currently scheduled pick-up time and the currently scheduled pick-up location for this leg. The dispatch controller 88 can also take into consideration other factors when making this determination such as current traffic conditions between each autonomous vehicle and the currently scheduled pick-up location.

For instance, in one non-limiting implementation, for a particular autonomous vehicle the dispatch controller 88 can consider average vehicle speed along a path between that autonomous vehicle and the currently scheduled pick-up location, determine the distance between that autonomous vehicle and the currently scheduled pick-up location, compute an estimated time-of-arrival to the currently scheduled pick-up location from the current location, and then determine whether the estimated time-of-arrival is within a time window that is based on the difference between the currently scheduled pick-up time and the current time. Thus, if autonomous vehicle 10$n$ is 1 mile away from the currently scheduled pick-up location, and the average vehicle speed along a path between that autonomous vehicle 10$n$ and the currently scheduled pick-up location is 60 mph, and the estimated time-of-arrival to the currently scheduled pick-up location from the current location is 1 minute. If the currently scheduled pick-up time is 6:05 PM and the current time is 5:59 PM, then the estimated time-of-arrival (1 minute) is within the time window of 6 minutes, and autonomous vehicle 10$n$ will be considered to be a candidate pick-up vehicle because it is in range. On the other hand, if the average vehicle speed along a path between that autonomous vehicle 10$n$ and the currently scheduled pick-up location is 5 mph, then the estimated time-of-arrival (12 minutes) is not within the time window of 6 minutes, and autonomous vehicle 10$n$ will not be considered to be a candidate pick-up vehicle because it is not in range.

After the dispatch controller 88 has determined which autonomous vehicles from fleet are "candidates" that are within range, the dispatch controller 88 can select one of the candidate autonomous vehicles to dispatch to the pick-up location. The methodology used to select one of the candidate autonomous vehicles can vary depending on the implementation and can take into account a number of factors used to determine the likelihood that each candidate can arrive at the currently scheduled pick-up location to the currently scheduled pick-up time. In some implementations, the dispatch controller 88 can simply select the candidate autonomous vehicle that has the shortest estimated time-of-arrival, or select from among those that fall within a certain tolerance (e.g., those having estimated time-of-arrivals within the lowest 20%). In other implementations, the dispatch controller 88 will make the selection by considering other factors such as concentration of autonomous vehicles in each area. For example, in another implementation, the dispatch controller 88 can take into account current density of autonomous vehicles in each area, and can elect a candidate autonomous vehicle that is in close proximity the many other autonomous vehicles even though another candidate autonomous vehicle in a different area happens to have a shorter time of estimated time-of-arrival, but is located in an area where the concentration of autonomous vehicles is less dense. In this implementation, the dispatch controller 88 might not pick the candidate autonomous vehicle that can get there first if it is in an area with few other autonomous vehicles.

The first autonomous vehicle 10 selected by the dispatch controller 88 from the fleet of autonomous vehicles 10 can be referred to as a "first" autonomous vehicle 10. The dispatch controller 88 sends the first autonomous vehicle 10 dispatch instructions to control dispatch of the first autonomous vehicle 10 the currently scheduled pick-up location. The dispatch instructions can include, for example, the currently scheduled pick-up location, and the currently scheduled pick-up time that the first autonomous vehicle 10 has to be at the currently scheduled pick-up location. The automated vehicle system 52 configured to automatically control the first autonomous vehicle 10, based on the dispatch instructions, to arrive at the currently scheduled pick-up location to pick-up the passenger for transport along the at least one transport leg.

Figure 4:
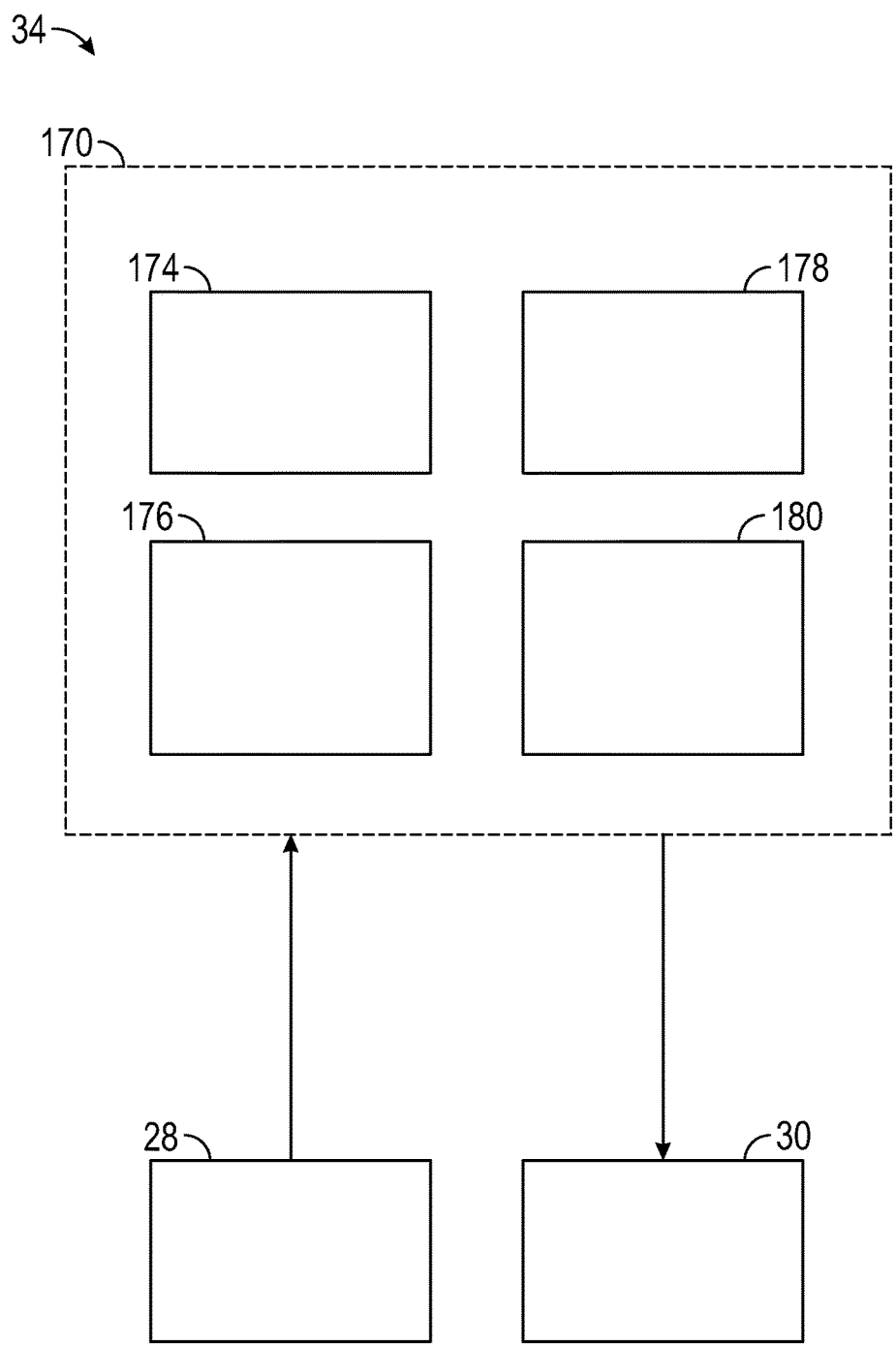
FIG. 4 is a functional block diagram illustrating an exemplary embodiment of a controller suitable for use in the autonomous vehicle shown in FIG. 1.

FIG. 4 is a functional block diagram illustrating an exemplary embodiment of the controller 34 onboard the autonomous vehicle 10 shown in FIG. 1. In accordance with various embodiments, the controller 34 implements an autonomous driving system (ADS) 170 as shown in FIG. 4. That is, suitable software and/or hardware components of the controller 34 (e.g., the processor 44 and the computer-readable storage device 46) are utilized to provide an autonomous driving system 170 that is used in conjunction with vehicle 10.

In various embodiments, the instructions of the autonomous driving system 170 may be organized by function or system. For example, as shown in FIG. 4, the autonomous driving system 170 can include a sensor fusion system 174, a positioning system 176, a guidance system 178, and a vehicle control system 180. As can be appreciated, in various embodiments, the instructions may be organized into any number of systems (e.g., combined, further partitioned, etc.) as the disclosure is not limited to the present examples.

In various embodiments, the sensor fusion system 174 synthesizes and processes sensor data and predicts the presence, location, classification, and/or path of objects and features of the environment of the vehicle 10. In various embodiments, the sensor fusion system 174 can incorporate information from multiple sensors, including but not limited to cameras, lidars, radars, and/or any number of other types of sensors.

The positioning system 176 processes sensor data along with other data to determine a position (e.g., a local position relative to a map, an exact position relative to lane of a road, vehicle heading, velocity, etc.) of the vehicle 10 relative to the environment. The guidance system 178 processes sensor data along with other data to determine a path for the vehicle 10 to follow. The vehicle control system 180 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Figure 5:
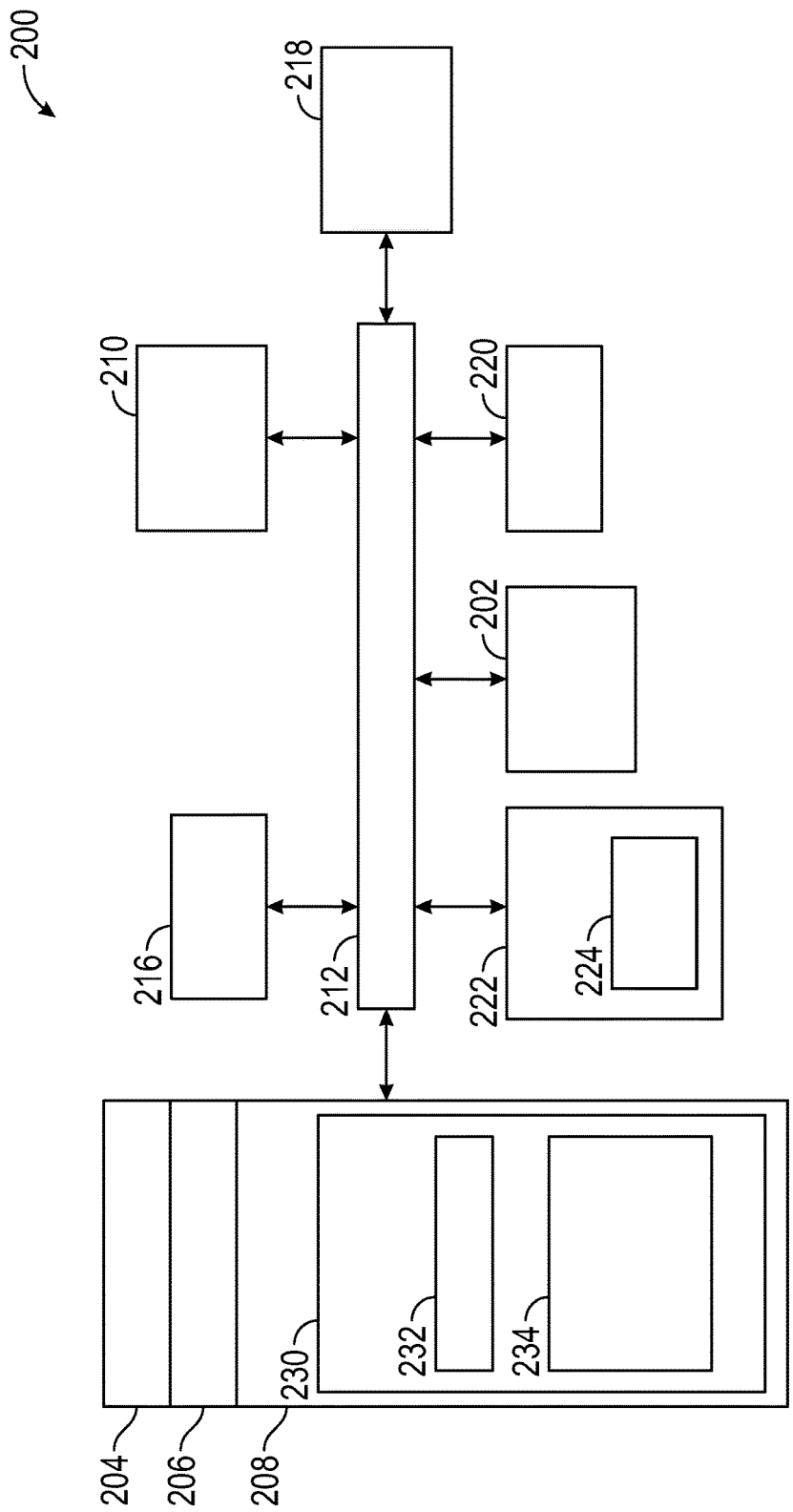
FIG. 5 is a block diagram of an exemplary embodiment of a user device that runs a transportation scheduling application in accordance with various embodiments.

FIG. 5 is a block diagram of an exemplary embodiment of a user device 54 that runs a multi-mode transportation scheduling application 234 in accordance with various embodiments. The user device 54 can include one or more processing system(s) 202, main memory 204, a network interface device (NID) 210, a chipset 212, input systems 216, and audio output systems 218, audio input systems 220, and a display 222 with a user interface 224. It will be appreciated that the user device 54 may not include all of the components shown in FIG. 5, may include other components that are not explicitly shown in FIG. 5, or may utilize an architecture completely different than that shown in FIG. 5.

The chipset 212 is usually located on a motherboard of the user device 54. The chipset 212 is a set of electronic components (e.g., in an integrated circuit) that interconnects and manages the data flow between the processing system(s) 202 and other elements of the user device 54 and any peripherals that are connected to the user device 54. For instance, the chipset 212 provides an interface between the processing system(s) 202 and the main memory 204, and also includes functionality for providing network connectivity through the NID 210, such as a gigabit Ethernet adapter. The chipset 212 typically contains the processor bus interface (also known as a front-side bus), memory controllers, bus controllers, I/O controllers, etc.

Processing system(s) 202 represents one or more general-purpose processing devices such as a microprocessor, central processing unit, or the like. More particularly, the processing system(s) 202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system(s) 202 may also be one or more special-purpose processing devices such as an application specific integrated circuit (ASIC), a field programmable gate array (FPGA), a digital signal processor (DSP), network processor, or the like.

The processing system(s) 202 can include one or more central processing units ("CPUs") that operate in conjunction with the chipset 212. The processing system(s) 202 perform arithmetic and logical operations necessary for the operation of the user device 54. The processing system(s) 202 can perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The NID 210 is capable of connecting the user device 54 to other computers over the network 56. The network 56 can be an Ethernet or Gigabyte Ethernet LAN, a fiber ring, a fiber star, wireless, optical, satellite, a WAN, a MAN, or any other network technology, topology, protocol, or combination thereof.

Input system(s) 216 (or input device(s)) allow the passenger to input information to the user device 54 and can include things such as a keyboard, a mouse or other cursor pointing device, a pen, a webcam device, etc. Audio output system(s) 218 (or output device(s)) present information to the passenger of the user device 54 and can include things such as speakers, or the like. Audio input system(s) 220 (or input device(s)) can include a voice input device and can include things such as microphones and associated electronics that are used by the passenger of the user device 54 to input audio information. The display 222 and it's user interface 224 provide a touch screen that functions as both a touch input device and a visual output system. All of these systems/devices are well known in the art and need not be discussed at length here.

The chipset 212 can provide an interface to various forms of computer-readable storage media including a main memory 204 (e.g., read-only memory (ROM), flash memory, dynamic random access memory (DRAM) such as synchronous DRAM (SDRAM)), and hard disk. The hard disk is a form of non-volatile memory that stores operating system (OS) software that is copied into RAM and executed by the processing system(s) 202 to control the operation of the user device 54, manage computer hardware and software resources, and provide common services for computer programs executed by the processing system(s) 202. The operating system makes the different parts of the user device 54 work together. The processing system(s) 202 can communicate with the various forms for computer-readable storage media via the chipset 212 and appropriate buses.

The main memory 204 may be composed of many different types of memory components. The main memory 204 can include non-volatile memory (such as read-only memory (ROM) 206, flash memory, etc.), volatile memory (such as random access memory (RAM) 208), or some combination of the two. The RAM 208 can be any type of suitable random access memory including the various types of dynamic random access memory (DRAM) such as SDRAM, the various types of static RAM (SRAM). The main memory 204 (as well as the processing system(s) 202) may be distributed throughout the user device 54.

The ROM 206 of the main memory 204 can be used to store firmware that includes program code containing the basic routines that help to start up the user device 54 and to transfer information between elements within the user device 54. The ROM of the main memory 204 may also store other software components necessary for the operation of the user device 54.

The RAM 208 stores programs/instructions 230 or executable code for one or more programs that can be loaded and executed at processing system(s) 202 to perform various functions. The programs/instructions 230 are computer readable program code that can be stored in RAM 208 (or other a non-transitory computer readable medium of the user device 54) that can be read and executed by processing system(s) 202 to perform various acts, tasks, functions, and steps as described herein. A few non-limiting examples of programs/instructions 230 that are stored in the RAM 208 include a browser application 232 and a multi-mode transportation scheduling application 234 in accordance with the embodiments described herein. The user device 54 can download the multi-mode transportation scheduling application 234, the presentation conference module 236, and the passenger multi-mode transportation scheduling application 234 as an application from a server (or online "store") and load it into RAM 208.

As is known in the art, the browser application 232 includes various functional modules including a user interface that includes a main window and various parts of the browser display such as the address bar, back/forward button, bookmarking menu etc., a browser engine which server as an interface for querying and manipulating one or more instances of rendering engine that is responsible for displaying the requested contents on a browser screen, a networking module used for network calls, a JavaScript Interpreter that is used to parse and execute the JavaScript code, user interface backend, a data storage or persistence layer that is used to save data, including cookies, on the hard disk, etc. When executed by the processing system(s) 202, the browser application 232 can be used for retrieving, presenting, and traversing information resources on the Internet. The browser application 232 brings information resources to the user ("retrieval" or "fetching"), allowing them to view the information ("display", "rendering"), and then access other information ("navigation", "following links"). An information resource is identified by a Uniform Resource Identifier (URI/URL) and may be a web page, image, video or other piece of content. Hyperlinks present in resources enable passengers easily to navigate to related resources.

The multi-mode transportation scheduling application 234 interacts with the scheduler service 82 at the scheduling server 70 (FIG. 3) to provide information regarding the location of the user device 54 and to render various User Interfaces (UIs) at the user device 54 that can be used by a passenger to schedule a transportation using the multi-mode transportation system 50, provide an initial transportation schedule that can be displayed at the user device 54 and updates to the transportation schedule, provide other status updates, and communicate with the scheduler service.

The user device can send the scheduler service a transport request that includes information such as the starting location and departure time, the final destination location and the final arrival time (requested) at the final destination location.

The multi-mode transportation scheduling application 234 corresponds to and interacts with the scheduling service 82 of the scheduling server 70. In one embodiment, when the passenger opens the multi-mode transportation scheduling application 234, the scheduling server 70 receives an identifier from the multi-mode transportation scheduling application 234 that identifies the passenger's account and the passenger's preferences. Upon execution of the multi-mode transportation scheduling application 234, the processing system 202 executes instructions to display prompts via the user interface 224 that allow the passenger to login (if necessary) by entering a password (or equivalent), and after authenticating the passenger, will allow the passenger to enter details regarding their transportation.

For example, the multi-mode transportation scheduling application 234 can display information and content (via the user interface 224) that allow the passenger to enter details such as starting location, departure time, destination location, and arrival time at the final destination location. When the passenger hits send, the processing system 202 generates a message that is sent, via the NID 210, to the scheduling server 70, and in response, the scheduling server 70 schedules the passenger's transportation, and communicates a message back to the multi-mode transportation scheduling application 234 that includes the details for the transportation. The multi-mode transportation scheduling application 234 can then display information and content (via the user interface 224) regarding the transportation schedule (e.g., starting location, pickup time, means of transport and locations of transitions during each leg, destination location, arrival time, etc.). This way the passenger can review the itinerary and make changes before the transportation starts.

In one embodiment, if there are any changes to the planned transportation schedule, the scheduling server 70 can generate and send out push notifications to the multi-mode transportation scheduling application 234 regarding status updates that might be of interest to that passenger.

The multi-mode transportation scheduling application 234 can display information and content regarding the passenger's preferences (e.g., based on information that the passenger has entered or that is associated with that passenger), and allow the passenger to set or change their preferences.

The multi-mode transportation scheduling application 234 can display information and content regarding the transportation schedule that the passenger is currently participating in (e.g., current status, upcoming transitions, etc.). The multi-mode transportation scheduling application 234 also allows the passenger to submit feedback messages to the scheduling server 70 (e.g., comments or responses to prompts from the scheduling server 70) so that the passenger can provide status updates that may impact scheduling of their AV (e.g., need to delay scheduled pickup time by 15 minutes.). For example, the scheduling server 70 can generate and send the passenger messages during transportation to request feedback from the passenger to confirm that the passenger's arrival time is on schedule. As another example, an action button or element can allow the passenger to initiate an interactive chat session with an agent so that adjustments can be made to their transportation plan based on unanticipated conflicts. This allows the passengers to interactively communicate in real-time with an agent regarding changes to their transportation schedule. There can also be an action button that allows the passenger to publish details regarding their current transportation on a social media feed so that others can track and view their current location in real-time or near real-time based on GPS updates provided from the user device.

Figure 6:
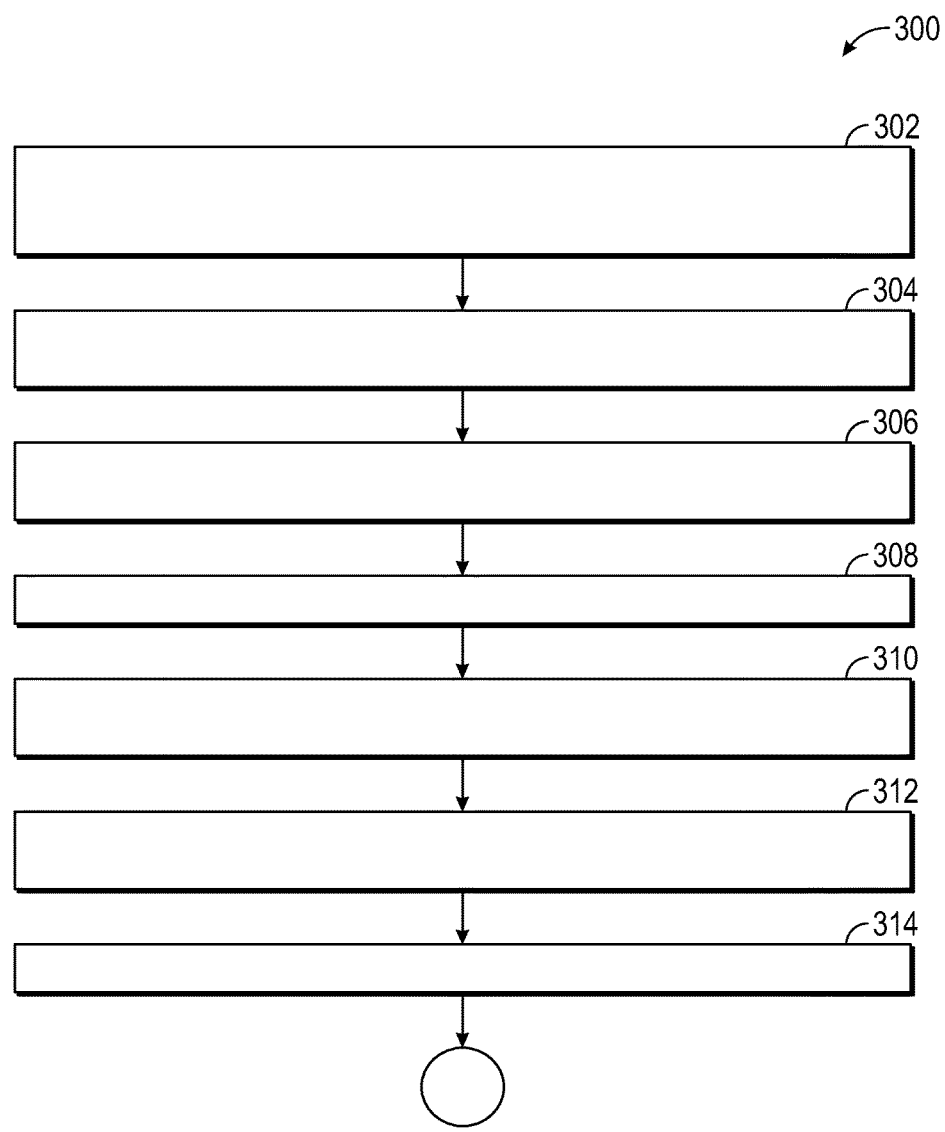
FIG. 6 is a flowchart that illustrates a multi-mode transportation method in accordance with various embodiments.
Figure 6:
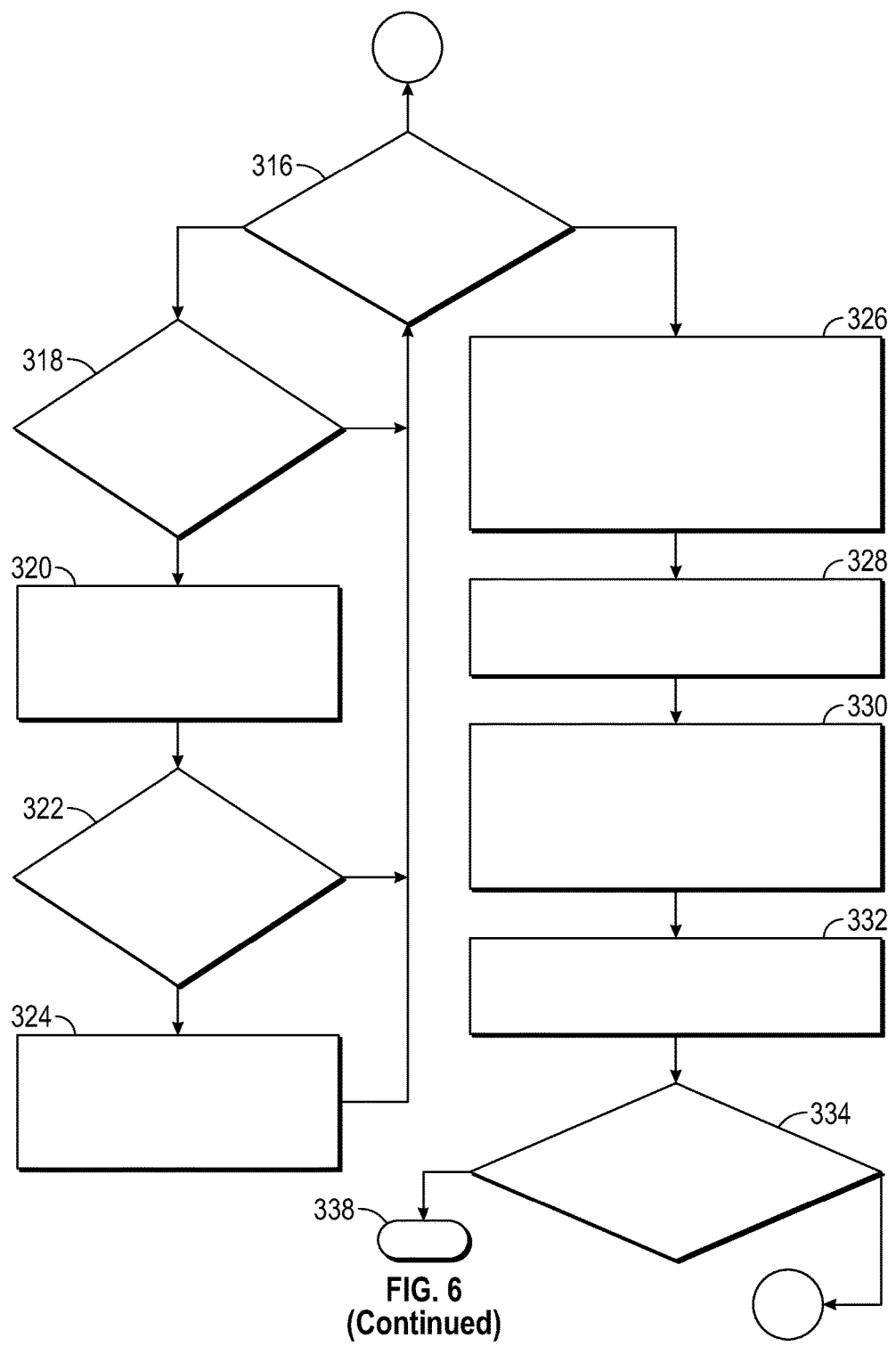

FIG. 6 is a flowchart that illustrates a multi-mode transportation method 300 in accordance with various embodiments. The multi-mode transportation method 300 can be used to control and/or adjust dispatch of an autonomous vehicle 10 so that the autonomous vehicle arrives at a pick-up location at a scheduled pick-up time. As can be appreciated, the order of operation within the method 300 is not limited to the sequential execution as illustrated in FIG. 6, but may be performed in one or more varying orders as applicable and in accordance with the present disclosure. In various embodiments, the method 300 can be scheduled to run based on one or more predetermined events, and/or can run continuously during operation of the transportation system 50. The method 300 may include any number of additional or alternative steps/tasks, and can be incorporated into a more comprehensive methodology having additional functionality not described in detail herein. In addition, one or more of the steps/tasks shown in FIG. 3 could be omitted from an embodiment of the method 330 as long as the intended overall functionality remains intact. The various steps/tasks performed in connection with the method 300 may be performed by software, hardware, firmware, or any combination thereof. The method 300 will be described with continued reference to FIGS. 2 and 3.

Method 300 begins at 302, when a transportation scheduling server 70 receives, a transport request from a user device. The transportation request can include passenger inputs comprising, such as a starting location, a departure time, a final destination location, and a final arrival time at the final destination location. In some implementations, the passenger inputs can include other information such as preferred modes of transportation, and modes of transportation that are to be excluded. For example, a certain passenger might prefer to travel by autonomous vehicle, and may want to exclude transportation via water-based vehicles such as ferry and other types of boats. This allows a travel plan to be tailored to the modes of transportation that the passenger prefers.

At 304, the scheduler service 82 obtains schedule information for different transportation systems from a plurality of databases 68 for the different transportation systems. This can be done via real-time API, or by periodically downloading schedules and storing them at the scheduler service 82, or a combination of the two approaches. Examples of the different transportation systems and different modes of transportation are described above.

At 306, the scheduler service 82 determines, by querying the route navigation systems 66, different route options for transporting the passenger from the starting location to the final destination location. A given route option can include any number of legs, and any number of modes of transportation over those legs. A route option could utilize a single transportation system (e.g., an autonomous vehicle) to transport the passenger from the starting location to the final destination location. This would be a conventional autonomous vehicle system where the transport is a simple ride in an autonomous vehicle. In accordance with the disclosed embodiments, each route option uses two or more of the different transportation systems to transport the passenger over two or more legs of a particular route from the starting location to the final destination location, where at least one of those legs uses an autonomous vehicle to transport the passenger. For example, a given route option may include transport over a first leg via subway, transport over a second leg via autonomous vehicle, transport over a third leg via a ferry, and then transport over a fourth leg via another autonomous vehicle. Another route option may include transport over a first leg via subway, transport over a second leg via train, transport over a third leg via an autonomous vehicle, transport over a fourth leg via another autonomous vehicle, transport over a fifth leg via aircraft, and conclude with transport over a sixth leg via another autonomous vehicle. It will be appreciated that these are just two non-limiting examples.

At 308, the scheduler service 82 selects one of the route options. In one embodiment, this selection by the scheduler service 82 is automated via use an optimizer module 84 that selects a particular route op that is optimized according to travel time, cost, passenger preferences regarding mode of transport, or any combination thereof. In another embodiment, the scheduler service 82 selects one of the route options based on input received from the passenger such as selection of that particular route option by the passenger. For example, the passenger can utilize an application on their user device 54 to select a particular route option and send that selection to the scheduler service 82. In one implementation, the route options presented to the passenger will have been narrowed down to a subset of all possible route options by the optimizer module 84 so that only certain route options are presented to the passenger that meet cost constraints, total travel time constraints, or preferred transportation modes.

At 310, the scheduler service 82 generates an initial transportation schedule for the passenger based on the selected route option. The initial transportation schedule comprises a list of transport legs (e.g., segments that make up part of the full transportation) along a route between the starting location and the destination location. The passenger will be transported over at least one transport leg of this route via an autonomous vehicle from a scheduled pick-up location. In one embodiment, prior to scheduling transport of the passenger per the initial transportation schedule, the scheduler service 82 can send the passenger (via his/her user device 54) a request to confirm that the initial transportation schedule is acceptable possibly including a request for payment. In another embodiment, the scheduler service 82 can send the passenger (via his/her user device 54) different transportation schedules that correspond to multiple, different route options to give the passenger different options, and allow the passenger to select one before sending a confirmation. As will be explained below, it is possible that the initial transportation schedule can change after being confirmed due to events that take place either before the passenger begins traveling or after the passenger starts traveling. When such events occur that impact the initial transportation schedules, the scheduler service 82 can update the transportation schedule by generating a "most recent" or current transportation schedule that accounts for any changes need to allow the passenger to keep his/her travel plan on track (to the extent possible).

After the initial transportation schedule is confirmed with the passenger, the method 300 proceeds to 312, where the scheduler service 82 sends the initial transportation schedule to the passenger and to the dispatch controller 88.

At 314, the scheduler service 82 begins monitoring for any changes to the initial transportation schedule. At 314, the scheduler service 82 also begins monitoring for arrival of the passenger at the scheduled pick-up location for the first leg that involves transport by an autonomous vehicle. This start time for monitoring at 314 can vary. In one implementation, monitoring can start as soon as transport the passenger confirms the transport schedule at 310. In another embodiment, monitoring starts when the passenger starts on first leg of route, or at a time shortly before the passenger is scheduled to start travel on first leg of route. In another embodiment, monitoring starts at a fixed time prior to when passenger is scheduled to start on leg immediately preceding the first leg of route that requires transport by an autonomous vehicle. Monitoring at 314 continues as transportation of the passenger progresses along the route.

At 316, the scheduler service 82 determines whether a currently scheduled pick-up time is within a dispatch threshold. As will be explained below, the "currently scheduled pick-up time" that is used at 316 can be an initial scheduled pick-up time (from the initial transportation schedule) or a most recent scheduled pick-up time if the initial transport schedule changes after it is set. In other words, if there have been no changes to the initial transportation schedule, then the initial scheduled pick-up time will be the currently scheduled pick-up time, but if there have been changes to the initial transportation schedule that change the initial scheduled pick-up time, the currently scheduled pick-up time will be different than the initial scheduled pick-up time to reflect updates. In one embodiment, the dispatch threshold can be set as a fixed amount of time needed to reasonably ensure that at least one autonomous vehicle from the fleet can arrive at the currently scheduled pick-up location by the time the passenger arrives. This approach works well when the fleet includes a sufficient number of autonomous vehicles so that one is always a short distance from the pick-up location. In other embodiments, the dispatch threshold can be determined dynamically by scheduling algorithms that take into account the current locations of each autonomous vehicle and their respective distances from the currently scheduled pick-up location, along with other parameters like current traffic conditions between the current location of each autonomous vehicle and the currently scheduled pick-up location, etc. This way the anticipated time-of-arrival for each autonomous vehicle to the currently scheduled pick-up location can be estimated and used to set a dispatch threshold that reasonably ensures that at least one autonomous vehicle in the fleet can arrive at the currently scheduled pick-up location prior to the currently scheduled pick-up time.

When the currently scheduled pick-up time is not within the dispatch threshold, this means that arrival of the passenger at the pick-up location is not "imminent," and the method 300 proceeds to 318 so that the scheduler service 82 can continue to monitor for events that might require a change to the current transportation schedule. At 318, the scheduler service 82 determines whether an event has occurred that requires a change to the transportation schedule. Any number of different events could cause the transportation schedule to change. A few examples include delays in transportation along one or more legs of the route, changes in schedule by one of the different transportation systems, passenger delays, requests for changes by the passenger, accidents, equipment failures, closure of infrastructure such as roads, highways, rail lines, etc.

When monitoring by the scheduler service 82 does not detect (at 318) any event that might require a change to the current transportation schedule, the method 300 loops back to 316, where the scheduler service 82 continues to check to determine whether a currently scheduled pick-up time is within a dispatch threshold. In some implementations, the checks at 316 and 318 are constantly executing such that the two steps are running or being executed concurrently to determine whether the currently scheduled pick up time is within a dispatch threshold and whether any events have occurred to impact the transportation schedule.

When monitoring by the scheduler service 82 detects (at 318) any event that will require a change to the current transportation schedule, the method 300 proceeds to 320, where the scheduler service 82 updates the transportation schedule based on changes to the transportation schedule, and then sends the updated transportation schedule from scheduler service 82 to dispatch controller 88. For example, when changes to the initial transportation schedule are detected, the scheduler service 82 updates the initial transportation schedule based on those changes to generate a current transportation schedule. In some cases, even though the initial transportation schedule changes, this will not impact the initial scheduled pick-up time or the initial scheduled pick-up location for this transport leg; they will remain the same. In other cases, one or both parameters can change, in which case it becomes necessary for the dispatch controller to change the initial scheduled pick-up time and/or the initial scheduled pick-up location to a new or "currently" scheduled pick-up time and/or a new or "currently" scheduled pick-up location for this transport leg (that is using an autonomous vehicle 10 to transport the passenger).

At 322, the dispatch controller 88 determines whether the changes to the transportation schedule have changed the scheduled pick-up time or the scheduled pick-up location for the next transport leg over which the passenger is to be transported via an autonomous vehicle from the scheduled pick-up location. Again, here, the scheduled pick-up time can be either the initial scheduled pick-up time or the currently scheduled pick-up time depending on whether or not the scheduled pick-up time has changed. Likewise, the scheduled pick-up location can be either the initial scheduled pick-up location or the currently scheduled pick-up location depending on whether or not the scheduled pick-up location has changed.

In some cases, changes to the transportation schedule will not change the currently scheduled pick-up time or the most scheduled pick-up location for the next transport leg. In other words, those portions of the transport schedule can remain the same, and therefore the scheduling for that transport leg remains the same. When this happens, the method 300 simply loops back to 316.

However, in other cases, changes to the transportation schedule will change either the currently scheduled pick-up time or the most scheduled pick-up location for the next transport leg, or possibly both the currently scheduled pick-up time and the most scheduled pick-up location for the next transport leg. When this happens (e.g., when the changes to the transportation schedule change the currently scheduled pick-up time to a new scheduled pick-up time and/or change the currently scheduled pick-up location to a new scheduled pick-up location), the method 300 proceeds to 324, where the dispatch controller 88 adjust the dispatch instructions to indicate the new scheduled pick-up time as the currently scheduled pick-up time, or the new scheduled pick-up location as the currently scheduled pick-up location. The method 300 then loops back to 316. This is beneficial since the most current dispatch instructions will be ready to send as soon as the scheduler service 82 determines (at 316) that the currently scheduled pick-up time is within the dispatch threshold.

When the scheduler service 82 determines (at 316) that the currently scheduled pick-up time is within the dispatch threshold, the method proceeds to 326. At 326, the dispatch controller 88 determines which autonomous vehicles from fleet are currently within range of the currently scheduled pick-up location for this leg as specified by the current transportation schedule. For example, the dispatch controller 88 can estimate a time-of-arrival to the currently scheduled pick-up location for each of the autonomous vehicles, determine a subset of the autonomous vehicles that have an estimated time-of-arrival that is prior to (or substantially the same as) the currently scheduled pick-up time, and then select one of the autonomous vehicles from that subset to pick up the passenger and transport the passenger over this transport leg.

At 328, the dispatch controller 88 selects a pick-up autonomous vehicle from the fleet of autonomous vehicles. This pick-up autonomous vehicle is one of the autonomous vehicles from that subset of autonomous vehicles that have been determined to be within range. At 330, the dispatch controller 88 generates dispatch instructions and sends the dispatch instructions to the pick-up autonomous vehicle. The dispatch instructions include either: (1) the initial scheduled pick-up location and the initial scheduled pick-up time that the pick-up autonomous vehicle 10 has to be at the initial scheduled pick-up location (as specified by the initial transportation schedule), or (2) a currently scheduled pick-up location and a currently scheduled pick-up time that the pick-up autonomous vehicle 10 has to be at the currently scheduled pick-up location (as specified by the current transportation schedule). This currently scheduled pick-up location and currently scheduled pick-up time can change each time the dispatch controller adjusts either parameter at 524, and therefore it is possible that currently scheduled pick-up location and currently scheduled pick-up time can change multiple times during the course of method 300 depending on changes that take place to the transportation schedule. At the same time, in other scenarios where the initial transportation schedule does not change then the dispatch instructions will simply include the initial scheduled pick-up location and the initial scheduled pick-up time.

At 332, the pick-up autonomous vehicle 10 is automatically controlled by the autonomous vehicle transportation system 52 based on the dispatch instructions so that the pick-up autonomous vehicle 10 arrives at either: (1) the initial scheduled pick-up location to pick-up the passenger for transport along the at least one transport leg as specified by the initial transportation schedule, or (2) the currently scheduled pick-up location to pick-up the passenger for transport along the at least one transport leg as specified by the current transportation schedule. In either case, the goal is to have the pick-up autonomous vehicle arrive at the pick-up location just in time to meet the passenger upon arrival, and at a minimum to ensure that the pick-up autonomous vehicle arrives either prior to or at the scheduled pick-up time for that transport leg so that it is ready to pick up the passenger when the passenger arrives at the pick-up location. While this cannot be guaranteed, in most cases the pick-up autonomous vehicle will be at the pick-up location either prior to or simultaneously with arrival of the passenger so that the passenger does not have to wait for the pick-AV. Because the arrival of the pick-up autonomous vehicle is tightly scheduled transportation resources on a fleet level are not wasted by having autonomous vehicles sit for long periods of time waiting for arrival of the passenger at the pick-up location.

As will be appreciated by those skilled in the art, any of the computer implemented systems, platforms or devices described herein can be implemented via a hardware platform that includes a processor architecture, memory, data storage apparatus, user interface, communication modules, display elements, etc.

A processor architecture may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. Moreover, the processor architecture may be implemented as a combination of computing devices, e.g., a combination of a digital signal processor and a microprocessor, a plurality of microprocessors, one or more microprocessors in conjunction with a digital signal processor core, or any other such configuration.

A memory may be realized as RAM memory, flash memory, EPROM memory, EEPROM memory, registers, a hard disk, a removable disk, a CD-ROM, or any other form of storage medium known in the art. In this regard, the memory can be coupled to the processor architecture such that the processor architecture can read information from, and write information to, the memory. In the alternative, the memory may be integral to the processor architecture. As an example, the processor architecture and the memory may reside in an ASIC. At least a portion of the memory can be realized as a computer storage medium, e.g., a tangible computer readable media element having non-transitory processor-executable instructions stored thereon. The computer-executable instructions can be configurable such that, when read and executed by the processor architecture, cause the hardware platform to perform certain tasks, operations, functions, and processes described in more detail herein. In this regard, the memory may represent one suitable implementation of such computer-readable media. Alternatively, or additionally, the hardware platform could receive and cooperate with computer-readable media (not separately shown) that is realized as a portable or mobile component or platform, e.g., a portable hard drive, a USB flash drive, an optical disc, or the like.

A data storage apparatus can be realized with the memory, or it can be implemented as a physically distinct component. The data storage apparatus employs a nonvolatile storage technology to save and maintain data as needed. For example, the data storage apparatus can include flash memory and/or a hard disk formatted to save data that is generated and used by the corresponding host system.

Device-specific hardware, software, firmware, and features may vary from one embodiment of the hardware platform to another. For the exemplary embodiments described here, the autonomous vehicles 10 and the user devices can include GPS receivers and/or other location determining hardware and functionality integrated therein. Thus, the vehicles 10 and/or the user devices can communicate with GPS satellites and process geographical position information to calculate their current geographical positions.

A user interface may include or cooperate with various features to allow a user to interact with the hardware platform. Accordingly, the user interface may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the passenger to select options, input information, or otherwise control the operation of the hardware platform. The user interface may include one or more graphical user interface (GUI) control elements that enable a passenger to manipulate or otherwise interact with an application via the display element.

Communication modules facilitates data communication between the hardware platform and other components as needed during the operation of the hardware platform. In practice, an embodiment of the hardware platform may support wireless data communication and/or wired data communication, using various data communication protocols. For example, the communication module could support one or more wireless data communication protocols, techniques, or methodologies, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. Moreover, the communication module could support one or more wired/cabled data communication protocols, including, without limitation: Ethernet; home network communication protocols; USB; IEEE 1394 (Firewire); hospital network communication protocols; and proprietary data communication protocols.

Display elements are suitably configured to enable the hardware platform to render and display various screens, GUIs, GUI control elements, drop down menus, auto-fill fields, text entry fields, message fields, or the like. Of course, the display element may also be utilized for the display of other information during the operation of the hardware platform, as is well understood. Notably, the specific configuration, operating characteristics, size, resolution, and functionality of the display element can vary depending upon the practical implementation of the hardware platform. For example, if the hardware platform is a laptop computer, then the display element may be a relatively large monitor. Alternatively, if the hardware platform is a cellular telephone device, then the display element may be a relatively small integrated display screen, which may be realized as a touch screen. When the hardware platform is implemented onboard a vehicle, the display element can be integrated in an instrument panel, an instrument cluster, a head-up display, or the like.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling dispatch of an autonomous vehicle so that the autonomous vehicle arrives at a scheduled pick-up location, the method comprising:

generating, at a scheduler service, an initial transportation schedule for a passenger based on a selected route option, wherein the initial transportation schedule comprises a list of two or more transport legs along a selected route between a starting location and a destination location, wherein the passenger is scheduled to be transported over at least one transport leg via an autonomous vehicle from an initial scheduled pick-up location at an initial scheduled pick-up time, and over another transport leg via another transport option that is either another autonomous vehicle or another mode of transportation;

communicating the initial transportation schedule from the scheduler service to a dispatch controller;

monitoring, at the scheduler service, for any changes to the initial transportation schedule;

updating, at the scheduler service when changes to the initial transportation schedule are detected, the initial transportation schedule based on the changes to the initial transportation schedule to generate a current transportation schedule that comprises a currently scheduled pick-up time and a currently scheduled pick-up location for the at least one transport leg that utilizes an autonomous vehicle to transport the passenger;

generating and sending, from a dispatch controller, dispatch instructions to a first autonomous vehicle, wherein the dispatch instructions include: the currently scheduled pick-up location and the currently scheduled pick-up time that the first autonomous vehicle has to be at the currently scheduled pick-up location for the at least one transport leg; and automatically controlling the first autonomous vehicle, based on the dispatch instructions, to arrive at the currently scheduled pick-up location to pick-up the passenger for transport along the at least one transport leg.

2. The method according to claim 1, further comprising:
determining, at the scheduler service, whether the currently scheduled pick-up time is within a dispatch threshold; and
selecting, at the dispatch controller, a first autonomous vehicle from a fleet of autonomous vehicles that has been determined to be within range to transport the passenger over the transport leg.

3. The method according to claim 2, further comprising:
determining, at the dispatch controller when the currently scheduled pick-up time is determined to be within the dispatch threshold, which autonomous vehicles from fleet are within range given the currently scheduled pick-up time and the currently scheduled pick-up location for this leg.

4. The method according to claim 2, wherein monitoring, at the scheduler service, for any changes, comprises
  determining, at the scheduler service when the currently scheduled pick-up time is determined not to be within the dispatch threshold, whether an event has occurred that requires a change to the initial transportation schedule; and
  further comprising:
  generating and sending the updated transportation schedule from the scheduler service to the dispatch controller when an event has occurred that requires a change to the initial transportation schedule.

5. The method according to claim 4, further comprising:
  determining at the dispatch controller, whether the updated transportation schedule has changed the currently scheduled pick-up time or the currently scheduled pick-up location for that transport leg over which the passenger is to be transported via an autonomous vehicle from the currently scheduled pick-up location;
  when the changes to the current transportation schedule change the currently scheduled pick-up time or change the currently scheduled pick-up location, adjusting the dispatch instructions to indicate updates to the currently scheduled pick-up time or the currently scheduled pick-up location.

6. The method according to claim 1, further comprising:
  receiving, at the scheduler service from a user device, a transport request comprising passenger inputs comprising: the starting location, a departure time, the final destination location, and a final arrival time at the final destination location;
  obtaining, at the scheduler service from a plurality of databases for different transportation systems, schedule information for the different transportation systems, wherein the different transportation systems provide different modes of transportation;
  determining, at the scheduler service, different route options for transporting the passenger from the starting location to the final destination location, wherein each route option uses two or more of the different transportation systems to transport the passenger over two or more legs of that route; and
  selecting, at the scheduler service, one of the route options.

7. The method according to claim 1, wherein the currently scheduled pick-up time is: the same as an initial scheduled pick-up time when there are no changes to the initial scheduled pick-up time, or different than the initial scheduled pick-up time when there are changes to the initial scheduled pick-up time, and
  wherein the currently scheduled pick-up location is: the same as the initial scheduled pick-up location when there are no changes to the initial scheduled pick-up location, or different than the initial scheduled pick-up location when there are changes to the initial scheduled pick-up location.

8. A multi-mode transportation system, comprising:
  a server, comprising:
    a scheduler service configured to:
      generate an initial transportation schedule including a list of two or more transport legs where transport over one or more transport legs is via an autonomous vehicle from an initial scheduled pick-up location at an initial scheduled pick-up time, and over another transport leg via another transport option that is either another autonomous vehicle or another mode of transportation;
      monitor for any changes to the initial transportation schedule; and
      update the initial transportation schedule when any changes are detected, based on the changes, to generate a current transportation schedule that includes a currently scheduled pick-up time and a currently scheduled pick-up location for the transport leg that utilizes an autonomous vehicle to transport a passenger, wherein the currently scheduled pick-up time is: the same as the initial scheduled pick-up time when there are no changes to the initial scheduled pick-up time, or different than the initial scheduled pick-up time when there are changes to the initial scheduled pick-up time, and wherein the currently scheduled pick-up location is: the same as the initial scheduled pick-up location when there are no changes to the initial scheduled pick-up location, or different than the initial scheduled pick-up location when there are changes to the initial scheduled pick-up location;
    a dispatch controller configured to: select a first autonomous vehicle from a fleet of autonomous vehicles; and send dispatch instructions to automatically control the first autonomous vehicle to arrive at the currently scheduled pick-up location to pick-up the passenger by the currently scheduled pick-up time.

9. The system according to claim 8, wherein the scheduler service is further configured to: determine whether the currently scheduled pick-up time is within a dispatch threshold.

10. The system according to claim 8, wherein the dispatch controller is further configured to:
  determine, when the currently scheduled pick-up time is within a dispatch threshold, which autonomous vehicles from fleet are within range given the currently scheduled pick-up time and the currently scheduled pick-up location for this leg; and
  select a first autonomous vehicle from the fleet of autonomous vehicles that has been determined to be within range to transport the passenger over the transport leg.

11. The system according to claim 8, wherein, as part of monitoring, the scheduler service is further configured to:
  determine, when the currently scheduled pick-up time is not within a dispatch threshold, whether an event has occurred that requires a change to the initial transportation schedule; and
  wherein the scheduler service is further configured to:
  generate and send the updated transportation schedule to the dispatch controller when an event has occurred that requires a change to the initial transportation schedule.

12. The system according to claim 11, wherein the dispatch controller is further configured to:
  determine whether the updated transportation schedule has changed the currently scheduled pick-up time or the currently scheduled pick-up location for that transport leg over which the passenger is to be transported via an autonomous vehicle from the currently scheduled pick-up location; and
  adjust, when the changes to the current transportation schedule change the currently scheduled pick-up time or change the currently scheduled pick-up location, the dispatch instructions to indicate updates to the currently scheduled pick-up time or the currently scheduled pick-up location.

13. The system according to claim 8, wherein the scheduler service is further configured to:

receive, from a user device, a transport request comprising passenger inputs comprising: the starting location, a departure time, the final destination location, and a final arrival time at the final destination location;
obtain from a plurality of databases for different transportation systems, schedule information for the different transportation systems, wherein the different transportation systems provide different modes of transportation;
determine different route options for transporting the passenger from the starting location to the final destination location, wherein each route option uses two or more of the different transportation systems to transport the passenger over two or more legs of that route; and
select one of the route options.

14. The system according to claim 13, wherein the initial transportation schedule comprises the list of transport legs along a selected route between the starting location and the destination location, wherein the passenger is scheduled to be transported over the at least one transport leg via an autonomous vehicle from the initial scheduled pick-up location at the initial scheduled pick-up time, the system further comprising:
wherein the scheduler service is further configured to:
generate the initial transportation schedule based on a selected route option and communicate the initial transportation schedule to the user device of the passenger and to the dispatch controller;
wherein the dispatch controller is configured to:
determine that the first autonomous vehicle is one of the fleet of autonomous vehicles that has been determined to be within range to transport the passenger over the transport leg, and
send the dispatch instructions to the first autonomous vehicle to control dispatch of the first autonomous vehicle, wherein the dispatch instructions include: the currently scheduled pick-up location and the currently scheduled pick-up time that the first autonomous vehicle has to be at the currently scheduled pick-up location for the at least one transport leg; and
wherein the first autonomous vehicle is automatically controlled, based on the dispatch instructions, to arrive at the currently scheduled pick-up location to pick-up the passenger for transport along the at least one transport leg.

15. A computer-readable storage medium comprising executable instructions stored thereon and configurable to cause a computer-based system to perform a method comprising:
generating, at a scheduler service, an initial transportation schedule for a passenger based on a selected route option, wherein the initial transportation schedule comprises a list of two or more transport legs along a selected route between a starting location and a destination location, wherein the passenger is scheduled to be transported over at least one transport leg via an autonomous vehicle from an initial scheduled pick-up location at an initial scheduled pick-up time, and over another transport leg via another transport option that is either another autonomous vehicle or another mode of transportation;
communicating, from the scheduler service, the initial transportation schedule to a user device of the passenger and to a dispatch controller;
monitoring, at the scheduler service, for any changes to the initial transportation schedule;
updating, at the scheduler service when changes to the initial transportation schedule are detected, the initial transportation schedule based on the changes to the initial transportation schedule to generate a current transportation schedule that comprises a currently scheduled pick-up time and a currently scheduled pick-up location for the at least one transport leg that utilizes an autonomous vehicle to transport the passenger;
generating and sending, from a dispatch controller, dispatch instructions to a first autonomous vehicle, wherein the dispatch instructions include: the currently scheduled pick-up location and the currently scheduled pick-up time that the first autonomous vehicle has to be at the currently scheduled pick-up location for the at least one transport leg; and
automatically controlling the first autonomous vehicle, based on the dispatch instructions, to arrive at the currently scheduled pick-up location to pick-up the passenger for transport along the at least one transport leg.

16. The computer-readable storage medium according to claim 15, the method further comprising:
determining, at the scheduler service, whether the currently scheduled pick-up time is within a dispatch threshold; and
selecting, at the dispatch controller, a first autonomous vehicle from a fleet of autonomous vehicles that has been determined to be within range to transport the passenger over the transport leg.

17. The computer-readable storage medium according to claim 16, the method further comprising:
when the currently scheduled pick-up time is determined to be within the dispatch threshold: determining, at the dispatch controller, which autonomous vehicles from fleet are within range given the currently scheduled pick-up time and the currently scheduled pick-up location for this leg.

18. The computer-readable storage medium according to claim 16, wherein monitoring, at the scheduler service, for any changes to the initial transportation schedule, comprises
determining, at the scheduler service when the currently scheduled pick-up time is not within the dispatch threshold, whether an event has occurred that requires a change to the initial transportation schedule; and
further comprising:
generating and sending the updated transportation schedule from the scheduler service to the dispatch controller when an event has occurred that requires a change to the initial transportation schedule.

19. The computer-readable storage medium according to claim 18, the method further comprising:
determining at the dispatch controller, whether the updated transportation schedule has changed the currently scheduled pick-up time or the currently scheduled pick-up location for that transport leg over which the passenger is to be transported via an autonomous vehicle from the currently scheduled pick-up location;
when the changes to the current transportation schedule change the currently scheduled pick-up time or change the currently scheduled pick-up location, adjusting the dispatch instructions to indicate updates to the currently scheduled pick-up time or the currently scheduled pick-up location.

20. The computer-readable storage medium according to claim 15, the method further comprising:
receiving, at the scheduler service from a user device, a transport request comprising passenger inputs comprising: the starting location, a departure time, the final destination location, and a final arrival time at the final destination location;

obtaining, at the scheduler service from a plurality of databases for different transportation systems, schedule information for the different transportation systems, wherein the different transportation systems provide different modes of transportation;

determining, at the scheduler service, different route options for transporting the passenger from the starting location to the final destination location, wherein each route option uses two or more of the different transportation systems to transport the passenger over two or more legs of that route; and selecting, at the scheduler service, one of the route options.

* * * * *